(12) United States Patent
Hallin et al.

(10) Patent No.: US 8,006,515 B2
(45) Date of Patent: Aug. 30, 2011

(54) ABSORPTION REFRIGERATOR

(75) Inventors: Ingemar Hallin, Lidingo (SE); Bjorn Flemsater, Lidingo (SE); Anders Bergqvist, Solna (SE)

(73) Assignee: Dometic Sweden AB, Solna (SE)

( * ) Notice: Subject to any disclaimer, the term of this patent is extended or adjusted under 35 U.S.C. 154(b) by 371 days.

(21) Appl. No.: 12/297,264

(22) PCT Filed: Apr. 20, 2007

(86) PCT No.: PCT/SE2007/000381
§ 371 (c)(1),
(2), (4) Date: Oct. 15, 2008

(87) PCT Pub. No.: WO2007/123463
PCT Pub. Date: Nov. 1, 2007

(65) Prior Publication Data
US 2009/0277214 A1 Nov. 12, 2009

(30) Foreign Application Priority Data
Apr. 21, 2006 (SE) .................................... 0600877

(51) Int. Cl.
*F25B 15/00* (2006.01)

(52) U.S. Cl. .......................................... 62/476; 62/101
(58) Field of Classification Search .................... 62/101, 62/476, 483, 485
See application file for complete search history.

(56) References Cited

U.S. PATENT DOCUMENTS

| 2,501,606 | A | * | 3/1950 | Kogel | 62/101 |
| 2,691,874 | A | * | 10/1954 | Martin | 62/489 |
| 3,338,062 | A | | 8/1967 | Kogel | |
| 4,458,504 | A | * | 7/1984 | Wallgren et al. | 62/490 |
| 4,922,730 | A | * | 5/1990 | Schupbach et al. | 62/476 |
| 5,634,353 | A | * | 6/1997 | Hallin et al. | 62/476 |
| 6,318,098 | B1 | | 11/2001 | Boxum | |

FOREIGN PATENT DOCUMENTS

| DE | 3412556 A1 | 10/1985 |
| GB | 281140 A | 12/1927 |
| GB | 500269 | 5/1936 |
| SE | 317393 B | 11/1969 |
| SE | 520469 C2 | 7/2003 |

OTHER PUBLICATIONS

International Search Report dated Aug. 10, 2007.

* cited by examiner

*Primary Examiner* — Melvin Jones
(74) *Attorney, Agent, or Firm* — Pearne & Gordon LLP

(57) ABSTRACT

Absorption refrigerator comprising; a cabinet having outer walls (1, 2, 4) and at least one door (3) which together encase at least one storage compartment (5) and which comprise a heat insulation material (2a, 3a, 11); and an absorption refrigerating system comprising a boiler (6), a water separator (7), a condenser (8), an evaporator (9) and an absorber (10), wherein said boiler, water separator, condenser and absorber are arranged outside said storage compartment. A channel (16) having an inlet (14) and an outlet (15) for conducting air through said channel is formed in an insulation (11) material comprised in one (4) of said outer walls. A ventilator (17) arranged to create a forced airflow in said channel. At least one of said absorber, condenser and water separator is arranged between said inlet and outlet in said channel.

29 Claims, 1 Drawing Sheet

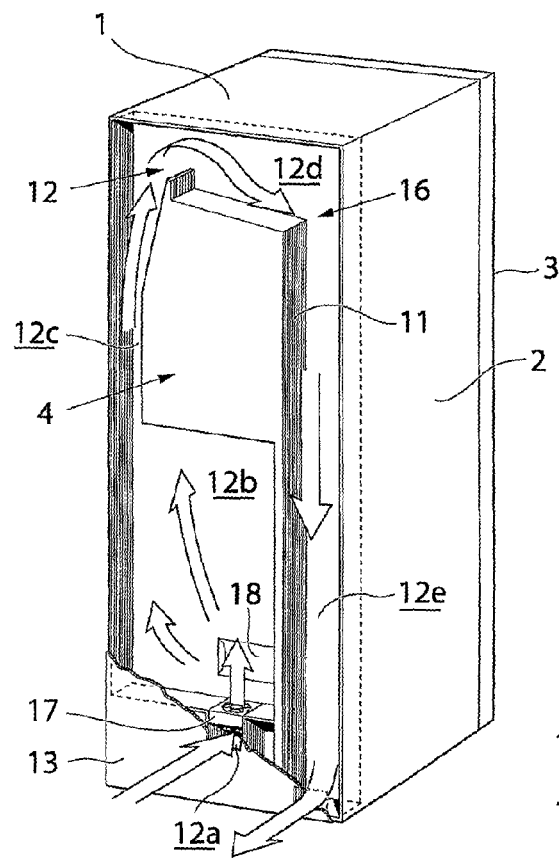
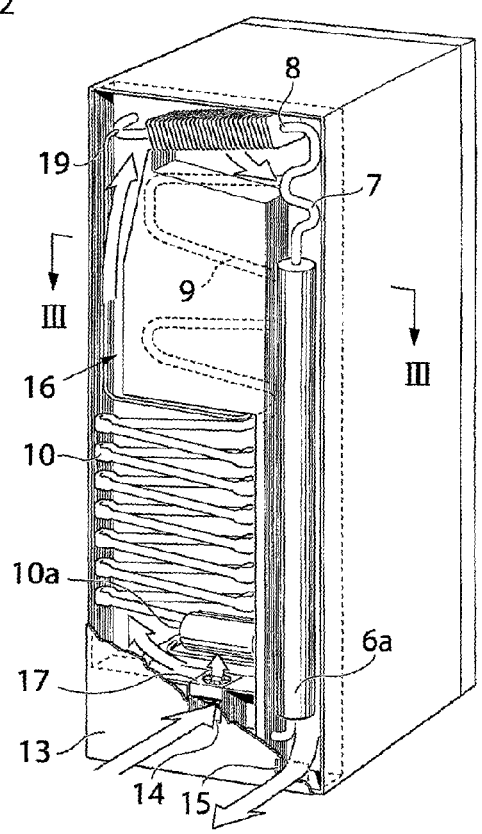
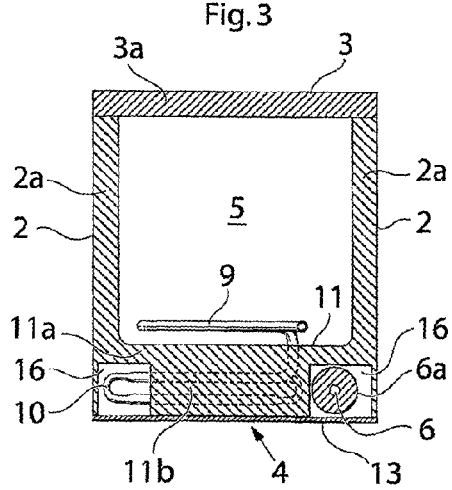

ABSORPTION REFRIGERATOR

FIELD OF THE INVENTION

The present invention relates to an absorption refrigerator comprising a cabinet having outer walls and at least one door, which together encase at least one storage compartment and an absorption refrigerating system. The refrigerator according to the invention is especially, but not exclusively, suited for use in recreational vehicles, pleasure crafts and at other mobile applications. The refrigerator system according to the invention may also find suitable applications when installed as so-called mini bars in e.g. hotel rooms and the like.

BACKGROUND

In modern recreational vehicles such as mobile homes, caravans and pleasure crafts there is a tendency to provide the living area of the vehicle with modern household appliances. It has shown desirable that these modern appliances differ as little as possible from corresponding appliances normally used in permanent homes. For example refrigerators used in modern recreational vehicles are very similar to household refrigerators what concerns the dimensions, number and type of compartments and capacity. A modern refrigerator for a recreational vehicle may thus comprises at least one refrigerator compartment and at least one freezer compartment and may have outer dimensions (H×W×D) up to 165×81×61 cm (65×32×24 inches).

A suitable choice of refrigerator for mobile use, for example in recreation vehicles, is an absorption refrigerator. Such an absorption refrigerator may comprise a single refrigerator compartment or fresh food compartment, maintaining the temperature at approx. 5° C. Normally, however, it comprises one freezer compartment maintaining the temperature at approximately −18° C. and one refrigerator compartment maintaining the temperature at approximately +5° C.

Briefly, the absorption refrigerator comprises a cabinet and an absorption refrigerating system including a heater or boiler, a water separator, a condenser, an evaporator and an absorber. These components of the refrigerator system are arranged in series in a closed loop with respect to a refrigerator medium, usually a water-ammonia mixture, which flows within the refrigerating system.

The evaporator, which forms a cold part of the refrigerator system, is normally arranged inside the compartments to be cooled. It may comprise a first tube section arranged to take up heat from the freezer compartment and a second tube section arranged to take up heat from the fresh food compartment, thereby lowering the temperature within the compartments.

The boiler, water separator, condenser and absorber together form a hot part of the refrigerator system and are normally arranged on the outside of the rear wall of the cabinet. Since these components generate heat, they need to be insulated from the compartments. This is done by arranging an insulation material, such as fibreglass or polystyrene foam, in the rear cabinet wall. Such insulation material is normally arranged also in the other cabinet walls and the cabinet doors for reducing heat transfer from the ambient atmosphere into the compartments.

The water separator, condenser and absorber need to be cooled. Such cooling is normally effected by allowing ambient air to pass over these components of the refrigerator system. The heat leakage from the boiler on the other hand should be kept as low as possible, for achieving satisfactory efficiency.

At recreational vehicles, such as mobile homes and caravans, the refrigerator is normally placed in a specially designed recess or niche arranged in the living area of the vehicle. The niche is arranged in proximity to an outer wall of the vehicle and comprises niche walls that extend inwardly from the inside of the vehicle's outer wall. The niche walls are further arranged to sealingly contact the top, side and possibly bottom walls of the refrigerator cabinet, such that the rear portion of the refrigerator is enclosed in the niche. The space defined by the inside of the vehicle's outer wall, the niche walls and the rear wall of the refrigerator cabinet is normally referred to as the cooling unit recess or the CUR. At installation of traditional refrigerators the hot part of the refrigerating system or the cooling unit is located within the CUR. By this means heat generated by the refrigerator system is prevented from dissipating into the living area of the vehicle. For cooling the refrigerator system, a lower and an upper ventilation aperture is arranged through the outer wall of the vehicle, such that the CUR is in communication with the atmosphere outside of the vehicle. Hereby, ambient air is allowed to enter through the lower aperture, and to exit through the upper aperture. Heat generated by the refrigerator system is transferred to the air, whereby a self-circulating airflow is created, which cools the refrigerator system.

Such an arrangement entails certain disadvantages. The construction and mounting of the niche per se require structural elements and labour and thereby entails costs. In order to achieve a great enough airflow through the CUR, the cross sectional area with respect to the airflow direction needs to have a certain smallest dimension. Normally this means that the volume of the CUR becomes at least approx. ¼ of the total inside volume of the storage compartments. The rate between useful food storage volume and total volume occupied by the refrigerator and CUR is limited thereby. The apertures of the CUR further need to be of a certain smallest dimension, which means that comparatively large openings need to be cut out in the vehicle wall. The apertures further need to be covered by correspondingly large grids or nets for preventing dust, insects and the like to enter the CUR. For satisfactory functioning of the known arrangement it is also required that the lower aperture is arranged at or below the lower end of the refrigerator whereas the upper aperture needs to be arranged at or above the upper end of the refrigerator. This means that the apertures need to be positioned differently for every different height of refrigerator to be installed and used in the vehicle. Especially if the refrigerator is to be placed beneath a bench in the vehicle, it is normally not possible to arrange the upper aperture high enough, whereby the cooling and efficiency of the refrigerator system is adversely affected. The necessity of arranging a pre-installed niche in the vehicle, especially since it needs to be arranged at an outer wall, also limits the free choice of where to place the refrigerator.

A further problem related to the prior known arrangements occurs at use under winter and other cold ambient conditions. At start up of the refrigerator at such cold conditions, it might happen that the refrigerator media has frozen. Not until heat generated by the boiler has melted the media, the refrigerator may operate properly. In order to speed up such melting, the airflow through the CUR may be reduced or prevented. In order to achieve this, specially designed winter condition covers need to be applied to the grids covering at least one of the openings in the outer walls of the vehicle. The necessity of such winter condition covers naturally adds to the costs and renders handling of the refrigerator more complicated.

SUMMARY OF THE INVENTION

An object of the present invention is therefore to provide an improved absorption refrigerator, especially but not exclusively for use in recreational vehicles, pleasure crafts and the like.

It is a further object to provide such a refrigerator, which allows for a great freedom of choice concerning where to place the refrigerator.

Another object is to provide such a refrigerator, which allows for an improved rate between useful storage space and total space occupied by the refrigerator.

A still further object is to provide such a refrigerator having a comparatively high overall efficiency.

Yet another object is to provide such a refrigerator, which allows for efficient cooling of the refrigerator system Still another object is to provide such a refrigerator, at which it is possible to use a comparatively large volume of insulation material in relation to the overall dimensions of the refrigerator.

A further object is to provide such a refrigerator, which allows for a comparatively great freedom of choice concerning the positioning of ventilation apertures in a vehicle in which the refrigerator is installed.

Yet a further object is to provide such a refrigerator, which allows for comparatively small ventilation apertures to be arranged in the vehicle or the like.

According to one aspect of the invention these and other objects are achieved by an absorption refrigerator as set out in the preamble of claim 1. In accordance with the invention the refrigerator comprises a channel which is formed in an insulation material comprised in one of the outer walls of the cabinet. The channel has an inlet and an outlet for conducting air through the channel. The channel comprises a first and a second channel section which sections are connected by a third channel section but separated by an intermediate portion of insulation material. A ventilator is arranged to create a forced flow of air in the channel. The absorber is arranged in the first channel section and the condenser is arranged in the second channel section.

At the absorption refrigerator according to the first aspect of the invention hot components of the refrigerating system that needs cooling is thus cooled by a forced ventilation airflow. By this means the cross sectional area and thereby the total volume occupied by the channel forming the air passage may be kept comparatively small. The channel, in which the components to be cooled are placed, concentrates the cooling capacity of the airflow to those critical components which need to be cooled. The area of the cabinet wall exposed to the comparatively warm airflow is also reduced. By this means the overall efficiency of the refrigerator is enhanced.

Furthermore, since the channel is arranged embedded in the insulation material and since the channel needs to occupy only a comparatively small volume, it is possible to use more insulation material without increasing the overall dimensions of the refrigerator. The additional insulation material is further arranged at that cabinet wall, which faces the hot part of the refrigerator system. This is especially advantageous since the temperature difference between the outside and inside of the refrigerator cabinet, which temperature difference is driving heat transfer into the cabinet compartments, is at its greatest at this wall.

Since the channel is formed in the insulation material in such a way that the absorber and the condenser are separated by an intermediate portion of insulation material, additional advantages are achieved. At absorption refrigerating systems the evaporator, which forms the coldest part of the system, is arranged in the storage compartment, at a level between the absorber and the condenser. By arranging an intermediate portion of the insulation material between these two components, this intermediate portion is arranged in level with and outside of the evaporator. By this means it is either possible to increase the thickness of the insulation in proximity to the evaporator to thereby decrease the heat leakage into the compartment. Alternatively it is possible maintain the insulation thickness and instead increase the useful volume of the storage compartment without increasing the total volume occupied by the entire cabinet. By this means the so-called net volume ratio, i.e. the ration between the volume of the storage compartment and the total volume occupied by the entire cabinet, may be increased without adversely influencing the heat leakage into the storage compartment or the cooling capacity of the cabinet.

The channel formed in the insulation material also provides for a great freedom of choice concerning where to arrange the inlet and outlet of the channel. By this means a correspondingly great freedom of choice concerning where to place the ventilating apertures in the vehicle wall is achieved. Especially, the positioning of the channel inlet and outlet may be standardized, e.g. to a lower right hand corner of the rear wall of the refrigerator. By this means also the position of the vehicle apertures may be standardized, whereby no adoption of such apertures is needed when installing refrigerators having different dimensions in a similar vehicle. Just as the cross sectional area of the channel may be kept small, also the dimensions of the vehicle apertures may be reduced. By this means the wall of the vehicle is influenced only to a smaller extend, which in turn contributes e.g. to a less influenced esthetical overall impression of the outside of the vehicle wall. Also the grids or nets covering the vehicle apertures may be made smaller and with standardized dimensions, whereby costs are reduced.

With the arrangement according to the invention it is further possible to arrange the channel such that either of or both the inlet and outlet is arranged at a bottom surface of the refrigerator. By this means the inlet and outlet may be connected to ducts or the like, which are arranged in or beneath the floor of the vehicle. Alternatively, the in- and outlet may be connected to vehicle apertures arranged through the vehicle floor. In both cases the apertures arranged in the outside wall of the vehicle may be omitted.

The channel may be entirely formed in the insulation, whereby the cavity forms a tunnel within the insulation material. However the channel is preferably partly formed as an outwardly open recess in said insulation material. By this means manufacturing is facilitated. E.g. polystyrene foam may be injected to the rear wall of the cabinet, where a mould defining the channel is placed. The mould may then be readily removed by simple extraction outwards from the rear cabinet wall.

Such an outwardly open channel may be finally defined and closed off outwards when the refrigerator is installed by placing the wall of the refrigerator comprising the channel in sealing contact with a wall or the like of a vehicle. In such case the vehicle wall contributes to defining the channel. However, the recess is preferably closed off outwardly by a sheet or plate type material, which forms part of the refrigerator. By this means the niche of the vehicle may be completely omitted. This embodiment also provides a refrigerator at which all outer walls may be completely flat, without any protruding components. This highly facilitates positioning and installation of the refrigerator.

The inlet and outlet may be arranged below an upper portion of said channel. The channel may then be used as a lock for preventing air circulation through the channel when the ventilator is turned off. Since a part of the channel is arranged above both the inlet and outlet, self-circulation will be prevented, whereby no circulation in the channel will occur as long as the ventilator is not activated. Such prevention of air circulation may be used at start up of the refrigerator at cold ambient conditions. By preventing circulation of the cooling air, the refrigerating media will more rapidly reach is operating temperature. Any winter condition covers or other means for manually reducing the cooling airflow may thereby be omitted. As soon as the media has reached it's operating temperature, the ventilator may be automatically activated.

The ventilator may preferably be a fan, which is arranged in proximity to an end portion of the channel. By this means a simple construction which e.g. facilitates maintenance and the arrangement of wires for power supply and control of the fan is achieved. The fan may preferably be arranged in proximity to the inlet end of the channel. By this means the fan will be exposed only to air holding the comparatively low ambient temperature, which reduces the wear of the fan.

By arranging the inlet and outlet in proximity to each other, the corresponding openings in the outer wall of the vehicle influences the outside visible impression of the vehicle wall only to a small extent. The openings may further then be arranged in a comparatively small maintenance hatch, which gives access to critical parts of the refrigerator system from the outside of the vehicle.

By arranging the inlet and outlet in a rear wall of said cabinet, classical installation of the refrigerator at an outer wall of the vehicle is permitted.

The inlet and outlet may however also be arranged in a bottom wall of said cabinet. This arrangement enhances the freedom of choice concerning where to place the refrigerator in the vehicle. The inlet and outlet may then be connected to openings arranged through the floor of the vehicle. By this means the refrigerator need not to be placed adjacent to an outer wall of the vehicle. Instead the refrigerator may be placed adjacent to an inner wall or even completely free standing in the vehicle. Instead of being connected to openings through the floor of the vehicle, the in- and outlets may be connected to ducts arranged in the floor. These ducts may open up either underneath the vehicle or at any sidewall of the vehicle to thereby cause little or no influence of the visible impression of the outside of the vehicle.

The channel and the hot components of the refrigerating system may be arranged according to a number of different configurations depending on the application of the refrigerator. For instance for applications both in recreational vehicles and as a mini bar, at least the absorber and the condenser may be arranged one after the other, with respect to said airflow, in said channel. By this means one and the same channel and air-flow may be used for cooling both these hot components. Since the absorber operates at a lower temperature than the condenser it is further advantageous if the absorber is arranged upstream of the condenser with respect to the airflow. Also the water separator may be arranged in the channel. In such case the water separator, which operates at a higher temperature than both the absorber and the condenser, is arranged downstream of these components.

Even though the boiler should not be excessively cooled, it is necessary to lead away heat generated by the boiler. Such heat would otherwise be transferred into the compartments of the refrigerator. The boiler may therefore be enclosed in a boiler insulation which is arranged in said channel, downstream of said water separator. The channel is then used also for ventilating the outside of the boiler insulation. Since the boiler insulation is arranged in the downstream region of the channel, the air passing the boiler insulation is comparatively warm, whereby no excessive cooling of the boiler insulation is caused.

The refrigerator may alternatively be provided with two channels. For instance at mini bar applications the absorber, condenser and water separator may then be arranged in a first channel and the boiler with insulation in a second channel. By this means the air flow through the second channel may be set or regulated independently of the flow through the first channel. Thereby the flow through the second channel may be kept low in order to avoid excessive cooling of the boiler, without affecting the cooling of the other hot components of the refrigerating system.

According to a further embodiment, which may be used both in recreational vehicles and mini bars, the absorber and the condenser are arranged in the first channel, whereas the water separator is arranged in the second channel. The water separator should not be excessively cooled and such an arrangement allows for separate adjustment of the cooling of the water separator. This adjustment may for example be achieved by choosing suitable dimensions of the cross section area of the second channel or by arranging a damper or an independently controlled fan in the second channel. This arrangement further allows for a greater freedom of choice of the positioning of the outlet of the first and second channel. Either or both of these outlets may then be positioned e.g. at an upper portion of the refrigerator if this would be suitable. The boiler with insulation may also be arranged in the second channel. By this means the airflow for cooling the two components working at lower temperatures, i.e. the absorber and the condenser, is separated from the airflow cooling the warmer water separator and boiler insulation.

Further objects and advantages of the invention according to the first aspect of the invention appear from the following detailed description and claims.

According to a second aspect, the invention also concerns an absorption refrigerator according to the preamble of claim 15, which absorption refrigerator comprises the special technical features as set out in the characterizing part of claim 15. The absorption refrigerator according to this aspect comprises a channel, having an inlet and an outlet for conducting air through said channel. The channel is formed by a continuous recess which is formed in an insulation material comprised in one of the outer walls. A ventilator is arranged to create a forced airflow in said channel. At least one of the absorber, condenser and water separator is arranged in said channel. The inlet and outlet of the channel are formed in proximity to each other and in one and the same of said outer walls.

By this means a great freedom of choice concerning the positioning of the corresponding ventilating apertures of a vehicle or the like where the refrigerator is used is achieved. Further more, the above mentioned problems related to having the in- and outlet of the channel separated by a comparatively great distance, e.g. at opposite ends of the rear wall are greatly reduced or completely remedied.

The inlet and outlet of the channel may be arranged in the rear wall of the cabinet. Preferably, the vertical distance between the inlet and outlet is less than or equal to half of the width of that outer wall in which said inlet and outlet are arranged.

The inlet and outlet may alternatively be arranged in the bottom wall of the cabinet.

The refrigerator may further comprise connection means for connecting the inlet and/or the outlet to a flexible conduit which is in communication with the ambient air outside of the space in which the refrigerator is placed. By this means an even grater freedom of choice concerning where to position the corresponding ventilating apertures in the vehicle or the like is achieved.

Further objects and advantages of the invention according to the second aspect of the invention appear from the following detailed description and claims as well as from the corresponding description above of the first aspect of the invention.

BRIEF DESCRIPTION OF THE DRAWINGS

In the following an exemplifying detailed description of an embodiment of the invention will be given with reference to the attached drawings, of which:

FIG. 1 is a perspective view from behind, with parts cut away of an absorption refrigerator according to an embodiment of the invention, where the refrigerating system has been removed.

FIG. 2 is a perspective view according to FIG. 1 with the refrigeration system of the absorption refrigerator.

FIG. 3 is a cross-section taken along line III-III in FIG. 2.

DETAILED DESCRIPTION OF EMBODIMENTS

FIG. 1 is a perspective view from behind of an exemplifying one-compartment absorption refrigerator for use in a recreational vehicle. The refrigerator comprises top 1, bottom and side 2 walls and a front door 3. The refrigerator also comprises a rear wall 4. The top, bottom, side and rear walls define together with the front door a fridge compartment 5 for storage of food at approx. +5° C. The top, bottom and sidewalls, as well as the front door are conventionally formed of a double shell construction filled with heat insulation material 2a, 3a in the form of polystyrene foam.

The refrigerator also comprises a conventional absorption refrigeration system, shown in FIGS. 2 and 3. The refrigeration system comprises a boiler 6, which is arranged in a cylindrical boiler insulation 6a, a water separator 7, a condenser 8 with heat dissipating fins, an evaporator 9 and an absorber 10 with an absorber vessel 10a. As indicated with dashed lines in FIG. 2, the evaporator, which forms a cold part of the refrigerating system, is arranged inside the compartment 5. The other components 6, 6a, 7, 8, 10, 10a, forming a hot part of the refrigerating system, are arranged outside the compartment 5.

Also the rear wall 4 comprises a heat insulating material 11 in the form of polystyrene foam. The heat insulation 11 comprises an inner portion 11a and an outer portion 11b. The inner and outer portions 11a, 11b are formed by injection of liquid polystyrene, which after injection expands and hardens. The inner portion 11a covers essentially the entire backside of the compartment and has a generally constant cross-section. The outer portion 12b protrudes backwardly, outwardly from the inner portion 11a. A continuous recess 12 is formed in the outer portion 11b of the insulation material 11. The recess 12 comprises a smaller inlet recess, 12a, a first enlarged space 12b, a first passage 12c, a second enlarged space 12d and a second passage 12e. The recess 12 is closed off backwardly by a sheet formed material formed of a comparatively thin metal plate 13. Alternatively the sheet formed material could be formed of any suitable material such as coated cardboard, plastic or the like. The metal plate 13 covers the entire rear side of the refrigerator and is fixed by screws or the like (not shown) to rearward edges of the top, bottom and sidewalls of the refrigerator. As is best seen in FIG. 3 the outer portion 11b of the insulation partially surrounding the recess 12, extends from the inner portion 11a all the way to and contacts the inside of the metal plate 13. An inlet opening 14 is arranged through the metal plate 13, such that it coincides with the inlet recess 12a. An outlet opening 15 is also arranged through the metal plate 13, such that it coincides with a lower end portion of the second passage 12d.

By this means a continuous channel 16 is defined by the recess 12 and the metal plate 13, which channel 16 extends between the inlet opening 14 and the outlet opening 15 in the metal plate 13. The channel 16 comprises a first channel section which corresponds to the first enlarged space 12b of the recess 12, a second section which corresponds to the second enlarged space 12d of the recess and a third section which corresponds to the first passage 12c of the recess. The outer portion 11b of the insulation material comprises an intermediate portion which is arranged between the first enlarged space 12b and the second enlarged space 12d of the recess 12, i.e. between the first and second section of the channel.

A ventilator in the form of an axial fan 17 is arranged in proximity to the inlet opening 14, at the junction between the inlet recess 12 and the first enlarged space 12b. The fan is preferably electrically controlled and connected to a control unit arranged for control of the refrigerator.

As is best seen in FIG. 2 the absorber 10 with absorber vessel 10a is arranged in the enlarged space 12b. For accommodating the boiler vessel 10a, a further recess 18 extends into the inner portion 11a of the insulation from the bottom of the enlarged space 12. A liquid ammonia tube 19 connecting the condenser 8 with the upstream end of the evaporator is arranged in the passage 12c. The condenser 8 is arranged in the second enlarged space 12d, which also accommodates an upper part of the water separator 7. The lower part of the water separator and the boiler 6 with the boiler insulation 6a is arranged in the second passage 12e.

As is best seen in FIG. 2, the first enlarged space 12b accommodating the absorber 10 is separated from the second enlarged space 12d accommodating the condenser by an intermediate portion of insulation material which is formed of the outer portion 11b of the insulating material. This intermediate portion is thereby arranged in level with and outside of the evaporator 9.

A maintenance hatch (not shown) comprising the inlet 14 and outlet 15 opening may be arranged in the lower right hand corner of the metal plate 13. By this means easy access to the fan 17 and a burner or other heater (not shown) arranged below the boiler is achieved.

Installation of the refrigerator in a recreational vehicle is also very simple. No niche or the like needs to be arranged in the vehicle. The refrigerator shown in the drawings is placed such that it's rear side faces the inside an outer wall of the vehicle. The refrigerator is positioned such that the inlet 14 and outlet 15 openings coincide with corresponding openings arranged through the vehicle wall. Since the positioning of the inlet and outlet openings of the refrigerator may be standardized, the corresponding openings of the vehicle may have the same positions and dimensions irrespective of which size of refrigerator is to be installed in the vehicle. The same applies to any grid, net or the like which is arranged to prevent foreign material such as leaves and insects to enter through the openings of the vehicle wall.

During normal operation the fan 17 is activated to create a controlled airflow from the inlet opening 14, through the inlet recess 12a, the first enlarged space 12b, the first passage 12c, the second enlarged space 12d, the second passage 12e and out through the outlet opening 15. The cooling air thus takes up heat first from the absorber 10, and absorber vessel 10a, which normally operates at about 40-50° C., then from the liquid ammonia tube 19, which normally holds a temperature of approx. 45-50° C., thereafter from the condenser 8 normally operating at about 50-60° C. and thereafter from the water separator 7, which normally operates at about 80-120° C. The airflow is thus optimized such that, for all components, the air passing the component has a lower temperature than the operating temperature of that component. After the water separator the air also passes the outer surface of the boiler insulation 6a. This normally holds about 60-80° C. When passing the boiler insulation 6a, the air prevents excessive heat to build up and to be transferred through the insulation into the refrigerator compartment 5. At the same time the comparatively warm air does not excessively cool the boiler insulation.

During start up of the refrigerator at winter or other low ambient conditions, the fan is kept inactivated. Since both the inlet 14 and the outlet 15 of the channel 16 is arranged below an upper portion, such as the second enlarged space 12d of the channel, self-circulation of air in the channel is prevented. No cooling of the refrigeration system is thus effected during such start up. Heat generated by the boiler will therefore be transferred more rapidly through the piping connecting the boiler with the other components holding the refrigeration medium. Thereby the refrigeration medium in these components will more rapidly be melted and brought to it's correct operating temperature. Once the refrigeration medium holds it's correct temperature the fan is started and the refrigerator is run at normal conditions. Such adaptation to winter condition may thus be achieved simply by automatic regulation of the fan and does not need any manual operation such as attaching covers or the like to the openings in the vehicle wall.

Above an exemplifying refrigerator according to the invention has been described. The invention is however not limited to this description, but may be freely varied within the scope of the claims.

The invention claimed is:

1. Absorption refrigerator comprising;
    a cabinet having outer walls (1, 2, 4) and at least one door (3) which together encase at least one storage compartment (5) and which comprise a heat insulation material (2a, 3a, 11); and
    an absorption refrigerating system comprising a boiler (6), a water separator (7), a condenser (8), an evaporator (9) and an absorber (10), wherein said boiler, water separator, condenser and absorber are arranged outside said storage compartment, characterized in
    that a channel (16) is formed in an insulation material (11) comprised in one (4) of said outer walls, which channel has an inlet (14) and an outlet (15) for conducting an airflow through said channel, and comprises a first section (12b) and a second section (12d), which first and second sections are connected by a third section (12c) but separated by an intermediate portion (11b) of insulation material;
    that a ventilator (17) arranged to create a forced airflow in said channel; and in
    that said absorber (10) is arranged in said first channel section and said condenser (8) is arranged in said second channel section.

2. Absorption refrigerator according to claim 1, wherein said channel (16) comprises a cavity which forms an outwardly open recess (12) in said insulation material (11).

3. Absorption refrigerator according to claim 2, wherein said recess (12) is closed off outwardly by a sheet or plate formed material (13).

4. Absorption refrigerator according to any of claims 1-3, wherein said inlet (14) and outlet (15) are arranged below an upper portion (12d) of said channel (16).

5. Absorption refrigerator according to claim 1, wherein said ventilator (17) is a fan arranged in proximity to an end portion of the channel (16).

6. Absorption refrigerator according to claim 1, wherein said inlet (14) and outlet (15) are arranged in proximity to each other.

7. Absorption refrigerator according to claim 6, wherein said inlet (14) and outlet (15) are arranged in a rear wall (4) of said cabinet.

8. Absorption refrigerator according to claim 6, wherein said inlet and outlet are arranged in a bottom wall of said cabinet.

9. Absorption refrigerator according to claim 1, wherein said absorber (10, 10a) is arranged upstream of said condenser (8) with respect to the airflow.

10. Absorption refrigerator according to claim 1, wherein said absorber (10, 10a), condenser (8) and water separator (7) are arranged in said channel (16), in series with respect to the airflow through the channel, the absorber being arranged upstream of the condenser which is arranged upstream of the water separator.

11. Absorption refrigerator according to claim 10, wherein said boiler (6) is enclosed in a boiler insulation (6a), which is arranged in, said channel (16), downstream of said water separator (7).

12. Absorption refrigerator according to claim 1, comprising a first and a second channel, wherein said absorber, condenser and water separator are arranged in the first channel and said boiler is enclosed in a boiler insulation which is arranged in said second channel.

13. Absorption refrigerator according to claim 1, comprising a first and a second channel, wherein said absorber and said condenser are arranged in the first channel, and said water separator is arranged in the second channel.

14. Absorption refrigerator according to claim 13, wherein said boiler is enclosed in a boiler insulation which is arranged in said second channel, preferably upstream of said water separator.

15. Absorption refrigerator comprising;
    a cabinet having outer walls (1, 2, 4) and at least one door (3) which together encase at least one storage compartment (5) and which comprise a heat insulation material (2a, 3a, 11); and
    an absorption refrigerating system comprising a boiler (6), a water separator (7), a condenser (8), an evaporator (9) and an absorber (10), wherein said boiler, water separator, condenser and absorber are arranged outside said storage compartment, characterized in
    that a channel (16), having an inlet (14) and an outlet (15) for conducting air through said channel is formed by a continuous recess which is formed in an insulation material (11) comprised in one (4) of said outer walls;
    that a ventilator (17) is arranged to create a forced airflow in said channel;
    that at least one of said absorber, condenser and water separator is arranged in said channel; and in
    that the inlet and outlet of the channel are formed in proximity to each other and in one and the same of said outer walls.

16. Absorption refrigerator according to claim 15, wherein the inlet and outlet are arranged in the rear wall of the cabinet.

17. Absorption refrigerator according to claim 15 or 16, wherein the vertical distance between said inlet and outlet is less than or equal to half of the width of that outer wall in which said inlet and outlet are arranged.

18. Absorption refrigerator according to claim 15, wherein the inlet and outlet are arranged in the bottom wall of the cabinet.

19. Absorption refrigerator according to claim 15, comprising connection means for connecting the inlet and/or the outlet to a flexible conduit which is in communication with the ambient air outside of the space in which the refrigerator is placed.

20. Absorption refrigerator according to claim 15, wherein said recess (12) is closed off outwardly by a sheet or plate formed material (13).

21. Absorption refrigerator according to claim 15, wherein said inlet (14) and outlet (15) are arranged below an upper portion (12d) of said channel (16).

22. Absorption refrigerator according to claim 15, wherein said ventilator (17) is a fan arranged in proximity to an end portion of the channel (16).

23. Absorption refrigerator according to claim 15, wherein at least said absorber (10, 10a) and said condenser (8) are arranged one after the other, with respect to said air flow, in said channel (16).

24. Absorption refrigerator according to claim 23, wherein said absorber (10, 10a) is arranged upstream of said condenser (8) with respect to the airflow.

25. Absorption refrigerator according to claim 15, wherein said absorber (10, 10a), condenser (8) and water separator (7) are arranged in said channel (16), in series with respect to the airflow through the channel, the absorber being arranged upstream of the condenser which is arranged upstream of the water separator.

26. Absorption refrigerator according to claim 25, wherein said boiler (6) is enclosed in a boiler insulation (6a), which is arranged in, said channel (16), downstream of said water separator (7).

27. Absorption refrigerator according to claim 15, comprising a first and a second channel, wherein said absorber, condenser and water separator are arranged in the first channel and said boiler is enclosed in a boiler insulation which is arranged in said second channel.

28. Absorption refrigerator according to claim 15, comprising a first and a second channel, wherein said absorber and said condenser are arranged in the first channel, and said water separator is arranged in the second channel.

29. Absorption refrigerator according to claim 28, wherein said boiler is enclosed in a boiler insulation which is arranged in said second channel, preferably upstream of said water separator.

* * * * *